(12) United States Patent
Wada et al.

(10) Patent No.: US 7,722,946 B2
(45) Date of Patent: May 25, 2010

(54) METHACRYLIC RESIN COMPOSITION, METHACRYLIC RESIN FILM, AND VINYL CHLORIDE MOLDED ARTICLE WITH THE FILM LAYERED

(75) Inventors: Kazuhito Wada, Kakogawa (JP); Norito Doi, Himeji (JP); Kimihide Nishimura, Kobe (JP)

(73) Assignee: Kaneka Corporation, Osaka (JP)

( * ) Notice: Subject to any disclaimer, the term of this patent is extended or adjusted under 35 U.S.C. 154(b) by 587 days.

(21) Appl. No.: 10/594,976

(22) PCT Filed: Mar. 28, 2005

(86) PCT No.: PCT/JP2005/005671

§ 371 (c)(1),
(2), (4) Date: Sep. 29, 2006

(87) PCT Pub. No.: WO2005/095478

PCT Pub. Date: Oct. 13, 2005

(65) Prior Publication Data

US 2007/0212561 A1    Sep. 13, 2007

(30) Foreign Application Priority Data

Mar. 31, 2004   (JP)   .............................. 2004-105502
Aug. 11, 2004   (JP)   .............................. 2004-234789

(51) Int. Cl.
*B32B 5/16* (2006.01)
*B32B 27/00* (2006.01)
*B32B 27/08* (2006.01)

(52) U.S. Cl. .................... 428/327; 428/500; 428/515

(58) Field of Classification Search .................. None
See application file for complete search history.

(56) References Cited

U.S. PATENT DOCUMENTS 4,611,061 A    9/1986  Beard et al.

6,387,497 B1 *  5/2002  Nishida et al. .............. 428/403

FOREIGN PATENT DOCUMENTS

| DE | 41 25 857 A1 | 4/1993 |
|---|---|---|
| EP | 0 659 829 A1 | 12/1994 |
| JP | 5-255447 A | 10/1993 |
| JP | 7-207106 A | 8/1995 |
| JP | 8-48802 A | 2/1996 |
| JP | 8-319326 A | 12/1996 |
| JP | 09-194542 A | 7/1997 |
| JP | 9-194542 A | 7/1997 |
| JP | 2003-192742 A | 7/2003 |
| JP | 2004-10805 A | 1/2004 |

OTHER PUBLICATIONS

Supplementary European Search Report issued in European Application No. EP 05 72 1598 dated Mar. 14, 2007.
International Search Report of PCT/JP2005/005671 date of mailing Jun. 28, 2005.
Notification of Transmittal of Translation of the International Preliminary Report on Patentability (Form PCT/IB/338) of International Application No. PCT/JP2005/005671 mailed Oct. 26, 2006 with Forms PCT/IB/373 and PCT/ISA/237.

* cited by examiner

*Primary Examiner*—Sheeba Ahmed
(74) *Attorney, Agent, or Firm*—Westerman, Hattori, Daniels & Adrian, LLP

(57) ABSTRACT

A resin composition suitable for forming a film excellent in transparency, weatherability, hardness, shock resistance, bending-fracturing resistance, and moldability; and a film excellent in weatherability even when laminated on a molded body comprising a PVC resin composition containing a plasticizer is provided. The film having the above characteristics can be obtained by making a methacrylic resin composition into a film, the methacrylic resin composition comprising a methacrylic resin composition (C) obtained by polymerizing a methacrylate polymer (A) obtained by polymerizing a monomer mixture mainly composed of alkyl methacrylate in the presence of acrylic crosslinked elastic particles (B) obtained by copolymerizing a monomer mixture mainly composed of alkyl acrylate and a polyfunctional monomer with two or more non-conjugated double bonds per a molecule; and being copolymerized with 0.01 to 50 parts by weight of an ultraviolet absorber represented by the general formula (1).

8 Claims, No Drawings

METHACRYLIC RESIN COMPOSITION, METHACRYLIC RESIN FILM, AND VINYL CHLORIDE MOLDED ARTICLE WITH THE FILM LAYERED

TECHNICAL FIELD

The present invention relates to methacrylic resins with ultraviolet-shielding characteristics; films formed therefrom; methacrylic resin films with excellent ultraviolet-shielding characteristics even when layered on molded articles comprising a polyvinyl chloride (PVC) resin composition containing a plasticizer; and vinyl chloride molded articles with the film layered thereon.

BACKGROUND ART

Methacrylic resins including a crosslinked elastic body and having excellent transparency, weatherability, hardness, and shock resistance are generally used with an ultraviolet absorber mixed therein. Especially, when it is used as a film, a large amount of an ultraviolet absorber has to be added as the thickness of the film becomes thinner.

Thus, when the film is formed by a method such as extrusion, there have been problems such as extruder's vent clogging, T-die's gum sticking, and chill roll's whitening, and when a further amount has to be added, there have been problems such as a rough film surface and elution (bleed out) to the film surface.

Even though a large amount of an ultraviolet absorber could be added to methacrylic resin compositions, since a general ultraviolet absorber has a poor compatibility with methacrylic resins and a low molecular weight, there is a problem in that the absorber is partially volatilized at the time of the extrusion, failing to bring out the ultraviolet-shielding characteristics. Also, since the ultraviolet absorber is released from methacrylic resin composition under a long-term usage, there is a problem in that the ultraviolet-shielding characteristics decrease over time. Further, when the methacrylic resin film is layered on a molded article comprising a PVC resin composition containing a plasticizer, since the plasticizer in the PVC resin permeates the methacrylic resin film and passes through to elute (bleed out), the elution (bleed out) of the ultraviolet absorber in the methacrylic resin film has been accelerated.

A generally known method for solving these problems is to select and add a particular ultraviolet absorber. However, in the method of simply adding a particular ultraviolet absorber, the added ultraviolet absorber in the obtained film is eluted (bleed out) when soaked with warm water and exposed to outdoors, and the problems such as a decline in ultraviolet-shielding characteristics and whitening are yet to be solved.

For such problems, there has been proposed a method in which a particular monomer showing ultraviolet absorbency is copolymerized with methacrylic resin (Patent Publication Documents 1 to 4). Although Patent Publication Documents 1 and 2 note copolymerizing an ultraviolet absorber represented by the general formula (1), it was not a polymer including a crosslinked elastic particle, and there still were problems of bending-fracturing resistance in its usage as a film. On the other hand, although Patent Publication Documents 3 and 4 disclose a film comprising a polymer including a crosslinked elastic particle, bending-fracturing resistance, and moldability (thinning of film) were unsatisfactory.

[Patent Publication Document 1] JP 60-38411 A

[Patent Publication Document 2] JP 05-255447 A

[Patent Publication Document 3] JP 09-194542 A

[Patent Publication Document 4] JP 08-319326 A

DISCLOSURE OF THE INVENTION

Problem to be Solved by the Invention

Thus, there has been a demand for a methacrylic resin composition capable of forming a film excellent in transparency, weatherability, hardness, shock resistance, bending-fracturing resistance, and moldability, and further for a methacrylic resin film excellent in weatherability even laminated on a molded body comprising a PVC resin composition containing a plasticizer.

Means for Solving the Problem

Thus, as a result of diligent examinations, the present inventors have achieved the present invention by finding that a film obtained from a methacrylic resin composition having a specific layer structure and particle size, comprising an acrylic crosslinked elastic particles and a methacrylate polymer, and being copolymerized with a monomer showing ultraviolet absorbency and having a specific chemical structural formula, is excellent in transparency, weatherability, hardness, and shock resistance, and is excellent in bending-fracturing resistance and moldability, and further is excellent in weatherability even being laminated on a molded body comprising a PVC resin composition containing a plasticizer.

That is, the present invention relates to a methacrylic resin composition comprising a methacrylic resin composition (C) obtained by polymerizing a methacrylate polymer (A) in the presence of acrylic crosslinked elastic particles (B), the methacrylate polymer (A) being obtained by polymerizing a monomer mixture including 50 to 100 wt % of alkyl methacrylate, and 0 to 50 wt % of alkyl acrylate, and the acrylic crosslinked elastic particles (B) being obtained by copolymerizing a monomer mixture (b) including 50 to 100 wt % of alkyl acrylate and 50 to 0 wt % of alkyl methacrylate, and a polyfunctional monomer including two or more non-conjugated double bonds per a molecule, wherein 0.01 to 30 parts by weight of an ultraviolet absorber-represented by the general formula (1) is copolymerized relative to 100 parts by weight of the methacrylic resin composition (C),

[Chemical Formula 3]

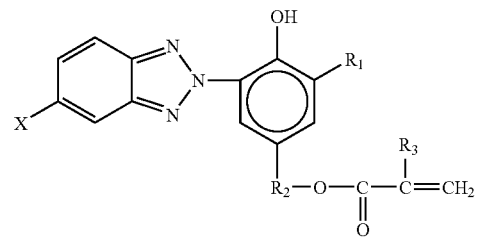

Genearl Formula (1)

(where X is H or halogen; $R_1$ is H, methyl or a t-alkyl group having 4 to 6 carbons; $R_2$ is a linear or a branched alkylene group having 2 to 10 carbons; and $R_3$ is H or methyl.) (claim 1):

The methacrylic resin composition in accordance with claim 1, wherein the methacrylic resin composition (C) is a two-layer structure polymer of the acrylic crosslinked elastic particles (B), and then the methacrylate polymer (A), an average particle size of the methacrylic resin composition (C) is more than 100 nm and 400 nm or less, and the acrylic crosslinked elastic particle (B) content is 5 to 45 wt % (claim 2):

A film formed with the methacrylic resin composition (C) in accordance with claim 1 or 2 (claim 3):

A laminate in which the film in accordance with claim 2 is laminated (claim 4):

The laminate in accordance with claim 4, produced by an injection molding (claim 5):

A methacrylic resin film for being laminated on a molded article comprising a polyvinyl chloride resin composition containing a plasticizer, the methacrylic resin film comprising a methacrylic resin composition (C) being obtained by polymerizing a methacrylate polymer (A) in the presence of acrylic crosslinked elastic particles (B), the methacrylate polymer (A) being obtained by polymerizing a monomer mixture including 50 to 100 wt % of alkyl methacrylate and 0 to 50 wt % of alkyl acrylate, and the acrylic crosslinked elastic particles (B) being obtained by copolymerizing a monomer mixture (b) including 50 to 100 wt % of alkyl acrylate and 50 to 0 wt % of alkyl methacrylate, and a polyfunctional monomer including two or more non-conjugated double bonds per a molecule, wherein 0.01 to 30 parts by weight of an ultraviolet absorber represented by the general formula (1) is copolymerized relative to 100 parts by weight of the methacrylic resin composition (C),

[Chemical Formula 4]

General Formula (1)

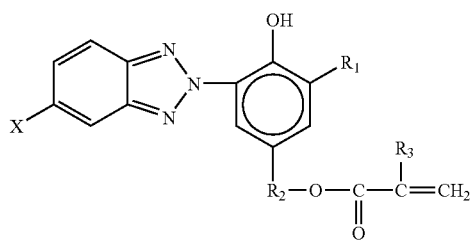

(where X is H or halogen; $R_1$ is H, methyl or a t-alkyl group having 4 to 6 carbons; $R_2$ is a linear or a branched alkylene group having 2 to 10 carbons; $R_3$ is H or methyl.) (claim 6):

The methacrylic resin film for being laminated on a molded article comprising a polyvinyl chloride resin composition containing a plasticizer in accordance with claim 6, wherein the methacrylic resin composition (C) is a two-layer structure polymer of the acrylic crosslinked elastic particles (B), and then the methacrylate polymer (A), an average particle size of the methacrylic resin composition (C) is more than 100 nm and 400 nm or less, and the acrylic crosslinked elastic particle (B) content is 5 to 45 wt % (claim 7):

The methacrylic resin film for being laminated on a molded article comprising a polyvinyl chloride resin composition containing a plasticizer in accordance with claim 6 or 7, wherein the ultraviolet absorber represented by the general formula (1) is copolymerized with the acrylic crosslinked elastic particles (B) (claim 8): and A vinyl chloride laminate in which a methacrylic resin film for being laminated on a molded article comprising a polyvinyl chloride resin composition containing a plasticizer in accordance with claims 6 to 8 is laminated (claim 9).

EFFECT OF THE INVENTION

A film formed with a methacrylic resin composition obtained by the present invention solves the problems involved with addition of an ultraviolet absorber by copolymerizing a monomer showing ultraviolet absorbency, while achieving excellence in transparency, weatherability, hardness, and shock resistance, which are necessary characteristics for a film. The film achieves excellence in bending-fracturing resistance and moldability as well, and further, in weatherability even when laminated on a molded article comprising a vinyl chloride resin composition containing a plasticizer.

DETAILED DESCRIPTION OF THE INVENTION

A methacrylate polymer (A) in the present invention is formed by polymerizing a monomer mixture including 50 to 100 wt % of alkyl methacrylate and 0 to 50 wt % of alkyl acrylate by at least one or more polymerization step, and further preferably, 60 to 100 wt % of the alkyl methacrylate, and 0 to 40 wt % of alkyl acrylate. When the alkyl acrylate is more than 50 wt %, thermal resistance and hardness of the film obtained from the methacrylic resin composition tend to decline.

The alkyl methacrylate forming the methacrylate polymer (A) in the present invention preferably has 1 to 12 carbons in the alkyl group in view of polymerization reactivity and costs, and the alkyl group may be linear or branched. Specific examples include methyl methacrylate, ethyl methacrylate, propyl methacrylate, n-butyl methacrylate, isobutyl methacrylate, and t-butyl methacrylate. These monomers may be used singly or in combination of two or more.

The alkyl acrylate forming the methacrylate polymer (A) in the present invention preferably has 1 to 12 carbons in the alkyl group in view of polymerization reactivity and costs, and the alkyl group may be linear or branched. Specific examples include methyl acrylate, ethyl acrylate, propyl acrylate, n-butyl acrylate, isobutyl acrylate, t-butyl acrylate, 2-ethylhexyl acrylate, and n-octyl acrylate. These monomers may be used singly or in combination of two or more.

In the methacrylate polymer (A) of the present invention, an ethylene unsaturated monomer capable of being copolymerized with alkyl methacrylate and alkyl acrylate may be copolymerized as necessary. Examples of these ethylene unsaturated monomers capable of copolymerization include, vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl derivatives such as styrene, vinyltoluene, and α-methyl styrene; vinylidene halides such as vinylidene chloride and vinylidene fluoride; acrylic acid and its salts such as acrylic acid, sodium acrylate, and calcium acrylate; alkyl acrylate derivatives such as β-hydroxyethyl acrylate, dimethyl aminoethyl acrylate, glycidyl acrylate, acrylamide, and N-methylolacrylamide; methacrylic acid and its salts such as methacrylic acid, sodium methacrylate, and calcium methacrylate; and alkyl methacrylate derivatives such as methacrylamide, β-hydroxyethyl methacrylate, dimethyl aminoethyl methacrylate, and glycidyl methacrylate. These monomers may be used in combination of two or more.

The acrylic crosslinked elastic particles (B) used in the present invention are formed by copolymerizing, by at least one polymerization step, a mixture comprising a monomer mixture (b) including 50 to 100 wt % of alkyl acrylate and 50 to 0 wt % of alkyl methacrylate, and a polyfunctional monomer with two or more non-conjugated double bond per a molecule. The monomer mixture (b) further preferably includes 60 to 100 wt % of alkyl acrylate and 40 to 0 wt % of alkyl methacrylate. When the alkyl methacrylate is more than 50 wt %, bending-fracturing resistance of the film that can be obtained from the methacrylic resin composition tends to decline.

Also, in the acrylic crosslinked elastic particles (B) of the present invention, an ethylene unsaturated monomer capable of being copolymerized with alkyl methacrylate and alkyl acrylate may be copolymerized, as necessary.

In the acrylic crosslinked elastic particles (B) of the present invention, a polyfunctional monomer with two or more non-conjugated, reactive double bonds per a molecule is copolymerized and therefore the obtained polymer shows crosslink elasticity. Additionally, one reactive functional group (double bond) remained unreacted at the time of polymerizing the acrylic crosslinked elastic particles (B) becomes a grafting intersection, and a certain proportion of the methacrylate copolymer (A) is grafted to the acrylic crosslinked elastic particles (B). Based on this, the acrylic crosslinked elastic particles (B) are discontinuously and homogenously dispersed in the methacrylate copolymer (A).

The polyfunctional monomer used in the present invention include allyl methacrylate, allyl acrylate, triallyl cyanurate, triallyl isocyanurate, diallyl phthalate, diallyl malate, divinyladipate, divinyl benzene ethylene glycol dimethacrylate, divinyl benzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These may be used in combination of two or more.

The amount of the polyfunctional monomer to be added in the acrylic crosslinked elastic particles (B) of the present invention is preferably 0.05 to 20 parts by weight, and further preferably 0.1 to 10 parts by weight, per 100 parts by weight of the monomer mixture (b). When the amount of the polyfunctional monomer to be added is less than 0.05 parts by weight, shock resistance and bending-fracturing resistance of the film that can be formed from the methacrylic resin composition tend to decline, and when the amount is more than 20 parts by weight, shock resistance and bending-fracturing resistance tend to decline as well.

Specific examples of alkyl acrylate and alkyl methacrylate used for the acrylic crosslinked elastic particles (B) of the present invention, and the ethylene unsaturated monomer capable of being copolymerized with these include the ones used for the above methacrylate polymer (A).

The methacrylic resin composition (C) used in the present invention is a multilayer structure polymer obtained by polymerizing the methacrylate polymer (A) in the presence of the acrylic crosslinked elastic particles (B).

Among these multilayer structure polymers, for the methacrylic resin composition (C) to be used in the present invention, a two-layer structure polymer of the acrylic crosslinked elastic particle (B) and then the methacrylate polymer is preferable, in view of bending-fracturing resistance and moldability (film thinning). On the other hand, for example, in a three-layer structure polymer which is polymerized stepwise successively from a methacrylate polymer (A), acrylic crosslinked elastic particles (B), and then the methacrylate polymer (A), bending-fracturing resistance of the film that can be formed from the obtained methacrylic resin composition tend to decline.

The acrylic crosslinked elastic particle (B) content in the present invention is preferably 5 to 45 wt %, further preferably 10 to 40 wt %, and still further preferably 15 to 35 wt %, when the methacrylic entire resin composition (C) is considered as 100 wt %. When the acrylic crosslinked elastic particle (B) content is less than 5 wt %, shock resistance and bending-fracturing resistance of the film that can be formed from the obtained methacrylic resin composition tend to decline, and when it is more than 45 wt %, film hardness and moldability tend to decline.

The methacrylic resin composition (C) used in the present invention is a methacrylic resin composition formed by copolymerizing the ultraviolet absorber represented by the general formula (1).

[Chemical Formula 5]

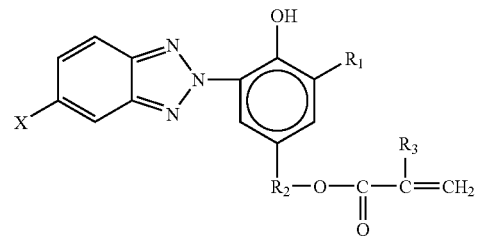

General Formula (1)

(where X is H or halogen; $R_1$ is H, methyl or t-alkyl group with 4 to 6 carbons; $R_2$ is linear or branched alkylene group with 2 to 10 carbons; $R_3$ is H or methyl.)

The ultraviolet absorber represented by the general formula (1) of the present invention includes particularly for example, 2-(2'-hydroxy-5'-methacryloyloxyethylphenyl)-2H-benzotriazoles, and 2-(2'-hydroxy-5'-acryloyloxyethylphenyl)-2H-benzotriazole, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, 2-(2'-hydroxy-5'-methacryloyloxyethyl-3'-t-butylphenyl)-2H-benzotriazole. Among these, 2-(2'-hydroxy-5'-methacryloyloxyethylphenyl)-2H-benzotriazole is further preferable in terms of costs and handleability.

The copolymerization ratio of the ultraviolet absorber represented by the general formula (1) in the present invention is preferably 0.01 to 30 parts by weight, further preferably 0.01 to 25 parts by weight, still further preferably 0.01 to 20 parts by weight, and most preferably 0.05 to 20 parts by weight relative to 100 parts by weight of the methacrylic resin composition (C). When the copolymerization ratio of the ultraviolet absorber represented by the general formula (1) is less than 0.01 parts by weight, weatherability of a film that can be formed from the obtained methacrylic resin composition and a film for laminating on a vinyl chloride-resin tend to decline, and when the ratio is more than 50 parts by weight, shock resistance and bending-fracturing resistance of the film tend to decline.

The ultraviolet absorber represented by the general formula (1) in the present invention may be copolymerized in any layer in the methacrylic resin composition (C) and is preferably copolymerized with the acrylic crosslinked elastic particles (B) in addition to the methacrylate copolymer (A), in terms of weatherability of the film, and the ultraviolet absorber is further preferably copolymerized homogenously in the entire methacrylic resin composition (C), in terms of weatherability of the film.

A production method of the methacrylic resin composition (C) of the present invention is not particularly limited and known methods such as an emulsion polymerization, an emulsion-suspension polymerization, a suspension polymerization, a bulk polymerization, or a solution polymerization can be applied, and the emulsion polymerization is the most preferable.

The copolymerization method of the ultraviolet absorber represented by the general formula (1) in the present invention is not particularly limited as well, and it is preferably copolymerized while the methacrylic resin composition (C) is being produced. For the copolymerization method, known methods such as an emulsion polymerization, an emulsion-suspension polymerization, a suspension polymerization, a bulk polymerization, or a solution polymerization can be applied, and the emulsion polymerization is particularly preferable.

For an initiator for polymerizing the acrylic crosslinked elastic particles (B) of the present invention, initiators such as known organic peroxides, inorganic peroxides, and azo compounds may be used. To be specific, for example, organic peroxides such as t-butylhydroperoxide, 1,1,3,3-tetra methyl butylhydroperoxide, succinic acid peroxide, peroximaleic acid t-butylester, cumenehydroperoxide, and benzoylperoxide; inorganic peroxides such as potassium persulfate and sodium persulfate; and further oil-soluble initiators such as azobisisobutyronitrile may be used. These can be used singly or may be used in combination of two or more. These initiators may be used as an ordinary redox initiator, in combination with a reductant such as sodium sulfite, sodium thiosulfite, sodium formaldehyde sulfoxylate, ascorbic acid, hydroxy acetic acid, ferrous sulfate, a complex of ferrous sulfate, and disodium ethylenediamine tetraacetate.

Although the organic peroxides may be added by known addition methods, such as a method by adding directly to polymer systems, by adding to the monomer by mixing, and by adding by dispersing in an aqueous solution of emulsifier, it is preferable that the organic peroxides are added by the method of adding to the monomer by mixing, or the method of adding by dispersing in an aqueous solution of an emulsifier, in view of transparency.

The organic peroxides are preferably used as a redox initiator, in combination with an inorganic reductant such as divalent salts of iron and/or an organic reductant such as sodium formaldehyde sulfoxylate, reduced sugar, and ascorbic acid, in view of polymerization stability and particle size control.

A surfactant used for the emulsion polymerization is not particularly limited as well, and an ordinary surfactant for emulsion polymerization may be used. To be specific, for example, an anion surfactant such as sodium alkyl sulfonate, sodium alkyl benzene sulfonate, sodium dioctyl sulfosuccinate, sodium lauryl sulfate, and sodium aliphatic acid; and nonionic surfactants such as reaction products of alkyl phenols or aliphatic alcohols and propylene oxide or ethylene oxide may be mentioned. These surfactants may be used singly or may be used in combination of two or more. Further, if desired, a cation surfactant such as salts of alkylamine may be used.

The average particle size of the obtained methacrylic resin composition (C) latex in the present invention is preferably more than 100 nm and 400 nm or less, further preferably more than 100 nm and 350 nm or less, and still further preferably more than 100 nm and 300 nm or less. When the average particle size of the methacrylic resin composition (C) latex is 100 nm or less, shock resistance and bending-fracturing resistance of the film that can be formed from the obtained methacrylic resin composition tend to decline, and when it is more than 400 nm, transparency of the film tends to decline.

In the obtained methacrylic resin composition (C) latex, a resin composition is separated and recovered by usual operation of solidifying, washing, and drying, or by processing such as spray drying and freeze drying.

The methacrylic resin composition (C) obtained in the present invention may be processed into various molded products by various plastic processing method such as injection molding, extrusion molding, blow molding, and compression molding.

The methacrylic resin composition (C) of the present invention is particularly useful as a film, and is processed excellently for example by ordinary melt extrusion such as an inflation method and T-die extrusion method, or a calendering method, and further a solvent casting method. Additionally, at the time of molding the film, by bringing both sides of the film into contact with rolls or metal belts as necessary, especially simultaneously with rolls or metal belts heated to a temperature of the glass transition temperature or more, a film with further excellent surface can be obtained. Additionally, according to the purpose, the film can be also be molded by lamination and reformed by a biaxial stretching.

Also, to the methacrylic resin composition (C) of the present invention, polyglutarimide, anhydrous glutaric acid polymer, cyclized lactone methacrylic resin, methacrylic resin, polyethyleneterephthalate resin, polybutylene terephthalate resin, and polyvinylidene fluoride resin may be mixed as necessary. The blending method is not particularly limited, and known methods may be used.

To the methacrylic resin composition (C) of the present invention, an inorganic pigment or an organic dye for coloring, an antioxidant, a heat stabilizer, an ultraviolet absorber, an ultraviolet stabilizer for a further improvement in stability for heat and light, or antimicrobial agent, deodorant, and lubricant may be added singly or in combination of two or more.

The thickness of the film obtained from the methacrylic resin composition (C) of the present invention is preferably 10 to 300 µm, and further preferably 10 to 200 µm. When the thickness of the film is less than 10 µm, workability of the film tend to decline, and when the thickness of the film is more than 300 µm, transparency of the film to be obtained tend to decline.

In the film obtained from the methacrylic resin composition (C) of the present invention, the gloss of the film surface can be decreased by known methods, as necessary. For example, the gloss decrease can be done by a method in which the methacrylic resin composition (C) is kneaded with an inorganic filler or a crosslinked polymer particle. Also, the obtained film may be embossed to decrease the gloss of the film surface.

The film obtained from the methacrylic resin composition of the present invention may be used for laminating on a metal and a plastic. For the laminating method of the film, lamination molding, wet laminating in which an adhesive is applied onto a metal plate such as a steel plate and then the film is placed on the metal plate for drying and lamination, dry laminating, extrusion laminating, and hot-melt laminating may be mentioned.

For a method for laminating a film on plastic parts, an insertion molding or a laminate injection press molding in which a film is disposed in a metal mold in advance and a resin is charged by an injection; and an inmold molding in which a film is premolded and then disposed in a metal mold, and then a resin is charged by injection may be mentioned.

A film-laminated product obtained from the methacrylic resin composition of the present invention may be used for painting alternatives such as an interior material for automobiles and exterior material for automobiles; construction elements such as window frame, bathroom facilities, wallpaper, and floor materials; housing for sundry articles, furniture, and electrical equipment; housing for OA equipment such as facsimile; and parts for electrical and electronic devices. Also, as a molded product, it may be used for a lens for lighting, a headlight for automobiles, an optical lens, an optical fiber, an optical disc, a light-guiding plate for liquid crystal, a film for liquid crystal, medical product that requires sterilization, a container for microwave cooking, housing for household electrical appliance, toys, or recreational products.

The film obtained from the methacrylic resin composition of the present invention may be used for laminating on a molded article comprising a vinyl chloride resin composition containing a plasticizer, for example, on sheets and extrusion molded products.

By laminating the film obtained from the methacrylic resin composition of the present invention on a molded article comprising a vinyl chloride resin composition containing a plasticizer, elution (bleed out) of the ultraviolet absorber in the methacrylic resin film, that have been accelerated due to penetration or elution (bleed out) of the plasticizer into the methacrylic resin film, can be prevented.

A method for laminating the film obtained from the methacrylic resin composition of the present invention on a molded article comprising a vinyl chloride resin composition containing a plasticizer includes lamination molding; wet laminating in which an adhesive is applied to a vinyl chloride sheet or a molded product and then a film is placed on the vinyl chloride sheet or the molded product and dried to be bonded; dry laminating; extrusion laminating; and hot-melt laminating may be mentioned.

A method for laminating a film on parts comprising a vinyl chloride resin composition containing a plasticizer includes an insertion molding or a laminate injection press molding in which a film is placed in a metal mold, and then a resin is charged by an injection molding; and an inmold molding in which a film is premolded, and then placed in a metal mold, and a resin is charged by an injection molding.

The vinyl chloride resin composition containing a plasticizer of the present invention is not particularly limited, but preferably the vinyl chloride resin comprises a soft vinyl chloride resin mixed with plasticizers such as dioctylphthalate (DOP), dibutylphthalate (DBP), dioctyladipate (DOA), and dioctyl sebacate (DOS).

The vinyl chloride resin of the present invention includes not only a polymer solely made of vinyl chloride, but also a copolymer of vinyl chloride and other monomer such as vinyl acetate, and a chlorinated vinyl chloride resin which is post-chlorinated. Also, the vinyl chloride resin of the present invention includes coated, dipped or laminated soft vinyl chloride resin.

A laminated product in which the methacrylic resin film of the present invention is laminated on a vinyl chloride resin molded article containing a plasticizer may be used for painting alternatives such as an interior material for automobiles, and an exterior material for automobiles; construction elements such as window frame, bathroom facilities, wallpaper, and floor materials; housings for sundry articles, furniture, and electrical equipment; housings for OA equipment such as facsimile; and electrical and electronic devices.

EXAMPLES

Next, the present invention is described further in detail based on Examples. However, the present invention is not limited to those Examples.

Methods for determining properties used in Examples and Comparative Examples below are as follows.

(Evaluation on Polymer Conversion Rate)

The obtained methacrylic resin composition (C) latex was dried in a hot-blast dryer at 120° C. for an hour to obtain a solid amount, and a polymer conversion rate (%) was calculated from 100×solid amount/charged monomer (%).

(Evaluation on Average Particle Size of Latex)

The obtained methacrylic resin composition (C) latex was diluted to a solid content concentration of 0.02% to make it a sample, and an average particle size was obtained from a light transmittance at a wavelength of 546 nm by using a spectrophotometer (Spectrophotometer U-2000 manufactured by HITACHI, Ltd.).

(Evaluation on Transparency)

The transparency of the obtained film is determined by measuring the haze under the conditions of a temperature of 23° C.±2° C. and a humidity of 50%±5% pursuant to JIS K6714.

(Evaluation of Pencil Hardness)

The pencil hardness of the obtained film was determined pursuant to JIS S-1005.

(Evaluation of Bending-Fracturing Resistance)

The obtained film was bent 180 degrees once, and the changes at the bent portion were evaluated visually at n=5.

○: no cracks are observed

Δ: some cracks or no cracks are observed

X: cracks are observed in all cases (Evaluation on Moldability)

The film molding is continuously carried out for 3 hours, its operation conditions were observed, and evaluated based on the following criterions.

○: thickness of the film is even and the film can be molded without cutoff

Δ: thickness of the film is uneven or film cutoff occurs

X: thickness of the film is uneven and film cutoff occurs (Evaluation on Ultraviolet Absorber Bleeding)

The film molding was continuously carried out for 3 hours, and adhesion on chill roll was observed, and evaluated based on the following criterions.

○: no adhesion is observed on chill roll

X: adhesion is observed on chill roll (Evaluation on Ultraviolet Absorption Retention Rate)

The soft vinyl chloride resin sheet was made as in below. That is, to 100 parts of a vinyl chloride resin (S 1003 Manufactured by Kanegafuchi Chemical Industry), 40 parts of DOP as a plasticizer, 0.5 part of a higher alcohol (KALCOL 86 Manufactured by Kao Corporation) and 0.5 part of an ester lubricant (PH 18 Manufactured by Riken Vitamin Co., LTD.) as lubricants, 0.4 part of an octyl Sn stabilizer (TVS 8813 Manufactured by Nitto Kasei Co., Ltd.), and 1 part of an octyl Sn stabilizer (TVS 8831 manufactured by Nitto Kasei Co., Ltd.) were powder-blended, and then the mixture was roll-kneaded at a roll temperature of 180° C. for 5 minutes by using a roll/press process (LABORATORY MILL (manufactured by KANSAI ROLL CO., LTD.). The obtained kneaded material was pressed at a temperature of 185° C. and a pressure of 10 kg/cm² for 10 minutes by using a hydraulic press (Shinto F-type manufactured by SHINTO METAL INDUSTRIES, LTD), thereby obtaining a soft vinyl chloride resin sheet with a thickness of 1 mm for a test.

The obtained film was pressed for 3 minutes on the above soft vinyl chloride resin sheet with a temperature of 180° C. and a pressure of 50 kg/cm² to obtain a laminate sheet.

The obtained laminate sheet was heated for a month at 70° C., and then a UV cut rate (=1−UV transmittance) at a wavelength of 360 nm was measured by using UV spectrum (self-recoding spectrophotometer U-3210 manufactured by Hitachi, Ltd.), and an ultraviolet absorption retention rate (%) was calculated by the following formula.

Ultraviolet absorption retention rate (%)=100×($UV$ cut rate after heating)/($UV$ cut rate before heating) (%)

"Part(s)" in Production Example, Example, and Comparative Example represents parts by weight, and "%" represents wt %. Additionally, materials are represented by following abbreviations.

BA: butyl acrylate

MMA: methyl methacrylate

CHP: cumenehydroperoxide tDM: tertiary dodecylmercaptan

ALMA: allyl methacrylate

RUVA: 2-(2'-hydroxy-5'-methacryloyloxyethylphenyl)-2-H-benzotriazole (RUVA-93 manufactured by Otsuka Chemical Co., Ltd.).

Production Example 1

Production of Methacrylic Resin Composition

The following materials are charged in an 8 L polymerization device with a mixer.

| | |
|---|---|
| Deionized Water | 200 parts |
| Sodium dioctyl sulfosuccinate | 0.25 part |
| Sodium formaldehyde sulfoxylate | 0.15 part |
| Disodium ethylenediamine tetraacetate | 0.001 part |
| Ferrous Sulfate | 0.00025 part |

The inside of the polymerization device was purged with nitrogen gas sufficiently so that there is substantially no oxygen, and then the inside temperature was set to 60° C. A monomer mixture (B) shown in Table 1(1) <i.e., 30 parts of a monomer mixture containing 1 part of ALMA and 0.2 part of CHP per 100 parts of a monomer mixture containing 90% of BA and 10% of MMA, and 0.6 part of RUVA> was added successively at a rate of 10 parts/hour, and after the addition, the polymerization was continued for another 0.5 hour, to obtain acrylic crosslinked elastic particles (B). The polymer conversion rate was 99.5%.

Afterwards, 0.05 part of sodium dioctyl sulfosuccinate was charged, and an internal temperature was set to 60° C. A monomer mixture (A) shown in Table 1 (1) <i.e., 70 parts of monomer mixture containing 0.5 part of tDM and 0.5 part of CHP per 100 parts of a monomer mixture containing 10% of BA and 90% of MMA, and 1.4 parts of RUVA> was added successively at a rate of 10 parts/hour, and the polymerization was continued for another hour, to obtain a methacrylic resin composition (C). The polymer conversion rate was 98.5%. The obtained latex was salted out with calcium chloride, solidified, washed with water, and dried, to obtain a resin powder (1). Further, a melt-kneading was carried out by using a uniaxial extruder with 40 millimeters φ vent and setting a cylinder temperature to 240° C. to pelletize.

TABLE 1

| | | Methacrylic Resin Composite (C) | | | | | | | | | | | |
|---|---|---|---|---|---|---|---|---|---|---|---|---|---|
| | | (1) | (2) | (3) | (4) | (5) | (6) | (7) | (8) | (9) | (10) | (11) | (12) |
| Initial Amount of Sodium dioctyl sulfosuccinate | (parts) | 0.25 | 0.25 | 0.25 | 0.25 | 0.25 | 0.25 | 0.25 | 0.25 | 0.25 | 0.2 | 0.4 | 0.1 |
| Acrylic crosslinkable elastic particles (B) | parts by weight | 30 | 15 | 20 | 30 | 30 | 30 | 30 | 30 | 50 | 30 | 30 | 30 |
| | BA (%) | 90 | 100 | 90 | 90 | 90 | 90 | 90 | 10 | 90 | 90 | 90 | 90 |
| | MMA (%) | 10 | 0 | 10 | 10 | 10 | 10 | 10 | 90 | 10 | 10 | 10 | 10 |
| | AlMA (parts) | 1 | 2 | 3 | 1 | 1 | 1 | 1 | 1 | 1 | 1 | 1 | 1 |
| | CHP (parts) | 0.2 | 0.2 | 0.2 | 0.2 | 0.2 | 0.5 | 0.2 | 0.2 | 0.2 | 0.2 | 0.2 | 0.2 |
| | RUVA (parts) | 0.6 | 1 | 0.4 | 0.03 | 0 | 10.5 | 0.6 | 0.6 | 1 | 0.6 | 0.6 | 0.6 |
| Methacrylate polymer (A) | parts by weight | 70 | 85 | 80 | 70 | 70 | 70 | 70 | 70 | 50 | 70 | 70 | 70 |
| | BA (%) | 10 | 10 | 10 | 10 | 10 | 10 | 80 | 10 | 10 | 10 | 10 | 10 |
| | MMA (%) | 90 | 90 | 90 | 90 | 90 | 90 | 20 | 90 | 90 | 90 | 90 | 90 |
| | tDM (parts) | 0.5 | 0.5 | 0.5 | 0.5 | 0.5 | 0.5 | 0.5 | 0.5 | 0.5 | 0.4 | 0.5 | 0.5 |
| | CHP (parts) | 0.5 | 0.5 | 0.5 | 0.5 | 0.5 | 1 | 0.5 | 0.5 | 0.5 | 0.5 | 0.5 | 0.5 |
| | RUVA (parts) | 1.4 | 4 | 1.6 | 0.07 | 0 | 24.5 | 1.4 | 1.4 | 1 | 1.4 | 1.4 | 1.4 |

Production Examples 2 to 9

A polymerization was carried out in the same manner as Production Example 1, except that the monomer composition was changed as shown in Table 1. Solidification, washing with water, and drying were carried out to obtain resin powders (2) to (9), and further a melt-kneading was carried out to pelletize. However, in Production Example (6), since a latex aggregated while in the polymerization, the resin powder (6) could not be obtained, failing to pelletize and make it into a film, and the film properties were not evaluated.

In Production Example (5), as an ultraviolet absorber, 2 parts of Tinuvin P (manufactured by Ciba Specialty Chemicals K.K.) represented by the structural formula (2) relative to 100 parts by weight of the obtained resin powder (5) was blended in and then a melt-kneading was carried out to pelletize.

[Chemical Formula 6]

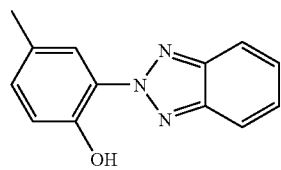

cation, washing with water, and drying were carried out to obtain resin powders (10) to (12), and further a melt-kneading was carried out to pelletize.

Production Example 13

Polymerization was carried out in the same manner as Production Example 1, except that before a polymerization of acrylic crosslinked elastic particles (B) by successively adding 20 parts of a monomer mixture containing 1 part of AlMA and 0.2 part of CHP per 100 parts of monomer mixture (b) containing 90% of BA and 10% of MMA, and 0.4 part of RUVA at a rate of 10 parts/hour, a polymerization of a methacrylate copolymer (A') was carried out by successively adding 10 parts of a monomer mixture containing 1 part of AlMA and 0.2 part of CHP per 100 parts of a monomer mixture (b') containing 10% of BA and 90% of MMA, and 0.2 part of RUVA at a rate of 10 parts/hour. Solidification, washing with water, and drying were carried out to obtain the resin powder (9), and further a melt-kneading was carried out to pelletize.

Examples 1 to 9, Comparative Examples 1 to 4

The pellets obtained in Production Examples were molded with a 40 millimeter φ extruder with a T-die, at a dice temperature of 240° C. to obtain a film with a thickness of 100 μm.

The various properties of the obtained film were evaluated, and the results are shown in Table 2.

TABLE 2

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Methacrylic resin composite (C) | (1) | (2) | (3) | (4) | (9) | (10) | (11) | (12) | (13) | (5) | (6) | (7) | (8) |
| Polymer Conversion Rate (%) | 98.5 | 98.7 | 98.5 | 99 | 98.1 | 98.6 | 98.2 | 98.4 | 98.5 | 98.9 | 85.3 | 97.8 | 98.3 |
| Average Particle Size (Å) | 1520 | 1650 | 1230 | 1540 | 1540 | 2070 | 920 | 4200 | 1500 | 1510 | Aggregated* | 1520 | 1470 |
| Transparency (%) | 0.5 | 0.6 | 0.6 | 0.6 | 0.8 | 0.6 | 0.4 | 2.2 | 0.6 | 0.5 | —*) | 0.6 | 0.6 |
| Pencil Hardness | B | H | H | B | 3B | B | B | B | B | B | —*) | 6B | H |
| Bending-fracturing Resistance | ○ | ○ | ○ | ○ | ○ | ○ | Δ | ○ | Δ | ○ | —*) | ○ | X |
| Moldability | ○ | ○ | ○ | ○ | Δ | ○ | Δ | ○ | ○ | ○ | —*) | X | X |
| Bleeding | ○ | ○ | ○ | ○ | ○ | ○ | ○ | ○ | ○ | X | —*) | ○ | ○ |

*)in Production Example (6), since the latex aggregated while in the emulsion polymerization, the resin powder (6) could not be obtained and the film could not be produced.

Production Examples 10 to 12

Polymerization was carried out in the same manner as Production Example 1, except that sodium dioctyl sulfosuccinate and the monomer composition to be charged at first were changed as shown in Table 1. By the change in the amount of sodium dioctyl sulfosuccinate, a resin with changed average particle size of latex was obtained. Solidifi- Examples 10 to 18, Comparative Examples 5 to 8

The pellets obtained in Production Examples were molded with a 40 millimeter φ extruder with a T-die at a dice temperature of 240° C., to obtain films with a thickness of 100 μM.

Further, an ultraviolet absorption retention rate was evaluated using the obtained films. The results are shown in Table 3.

TABLE 3

|  | Example | | | | | | | | | Comparative Example | | | |
| --- | --- | --- | --- | --- | --- | --- | --- | --- | --- | --- | --- | --- | --- |
|  | 10 | 11 | 12 | 13 | 14 | 15 | 16 | 17 | 18 | 5 | 6 | 7 | 8 |
| Methacrylac resin composite (C) | (1) | (2) | (3) | (4) | (9) | (10) | (11) | (12) | (13) | (5) | (6) | (7) | (8) |
| Polymer Conversion Rate (%) | 98.5 | 98.7 | 98.5 | 99 | 98.1 | 98.6 | 98.2 | 98.4 | 98.5 | 98.9 | 85.3 | 97.8 | 98.3 |
| Average Particle Size (Å) | 1520 | 1650 | 1230 | 1540 | 1540 | 2070 | 920 | 4200 | 1500 | 1510 | Aggregated*) | 1520 | 1470 |
| Transparency (%) | 0.5 | 0.6 | 0.6 | 0.6 | 0.8 | 0.6 | 0.4 | 2.2 | 0.6 | 0.5 | —*) | 0.6 | 0.6 |
| Pencil Hardness | B | H | H | B | 3B | B | B | B | B | B | —*) | 6B | H |
| Bending-fracturing Resistance | ○ | ○ | ○ | ○ | ○ | ○ | Δ | ○ | Δ | ○ | —*) | ○ | X |
| Moldability | ○ | ○ | ○ | ○ | Δ | ○ | Δ | ○ | ○ | ○ | —*) | X | X |
| Ultraviolet Absorption Retention Rate(%) | 98 | 97 | 98 | 99 | 97 | 95 | 98 | 97 | 98 | 56 | —*) | 97 | 98 |

*)in Production Example (6), since the latex aggregated while in the emulsion polymerization, the resin powder (6) could not be obtained and the film could not be produced.

When the monomer composition ratio, and further the layer structure, the average particle size, and the acrylic crosslinked elastic particle (B) content of the methacrylic resin composition (C) were out of the range of present invention, a film excellent in transparency, weatherability, hardness, shock resistance, bending-fracturing resistance, and moldability could not be obtained.

The invention claimed is:

1. A methacrylic resin composition comprising a methacrylic resin composition (C) obtained by polymerizing a methacrylate polymer (A) in the presence of acrylic crosslinked elastic particles (B), the methacrylate polymer (A) being obtained by copolymerizing a monomer mixture (a) including 50 to 100 wt % of alkyl methacrylate and 0 to 50 wt % of alkyl acrylate, the acrylic crosslinked elastic particles (B) being obtained by copolymerizing a monomer mixture (b) including 50 to 100 wt % of alkyl acrylate and 50 to 0 wt % of alkyl methacrylate, and a polyfunctional monomer including two or more non-conjugated double bonds per a molecule, wherein 0.01 to 30 parts by weight based on 100 parts by weight of the methacrylic resin composition (C) of an ultraviolet absorber represented by the general formula (1) is copolymerized with said copolymerizing monomer mixture (b) and said monomer mixture (a),

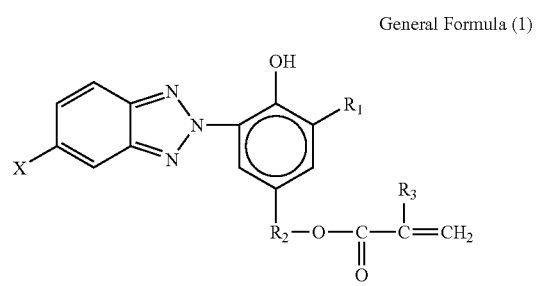

General Formula (1)

(where X is H or halogen; $R_1$ is H, methyl, or a t-alkyl group having 4 to 6 carbons; $R_2$ is a linear or a branched alkylene group having 2 to 10 carbons; and $R_3$ is H or methyl).

2. The methacrylic resin composition (C) in accordance with claim 1, wherein the methacrylic resin composition (C) is a two-layer structure polymer of the acrylic crosslinked elastic particles (B), and the methacrylate polymer (A), an average particle size of the methacrylic resin composition (C) is more than 100 nm and 400 nm or less, and the acrylic crosslinked elastic particle (B) content is 5 to 45 wt % based on the entire methacrylic resin composition (C).

3. A film formed with the methacrylic resin composition (C) in accordance with claim 1.

4. A laminate in which the film in accordance with claim 3 is laminated.

5. The laminate in accordance with claim 4, produced by an injection molding.

6. A methacrylic resin film for being laminated on a molded article comprising a polyvinyl chloride resin composition containing a plasticizer, said methacrylic resin film comprising a methacrylic resin composition (C) being obtained by polymerizing a methacrylate polymer (A) in the presence of acrylic crosslinked elastic particles (B), the methacrylate polymer (A) being obtained by polymerizing a monomer mixture (a) including 50 to 100 wt % of alkyl methacrylate and 0 to 50 wt % of alkyl acrylate, and the acrylic crosslinked elastic particles (B) being obtained by copolymerizing a monomer mixture (b) including 50 to 100 wt % of alkyl acrylate and 50 to 0 wt % of alkyl methacrylate, and a polyfunctional monomer including two or more non-conjugated double bonds per a molecule, wherein 0.01 to 30 parts by weight based on 100 parts by weight of the methacrylic resin composition (C) of an ultraviolet absorber represented by the general formula (1) is copolymerized with said copolymerizing monomer mixture (b) and said monomer mixture (a), General Formula (1)

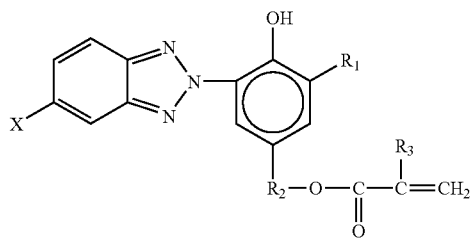

(where X is H or halogen; $R_1$ is H, methyl, or a t-alkyl group having 4 to 6 carbons; $R_2$ is a linear or branched alkylene group having 2 to 10 carbons; and $R_3$ is H or methyl.)

7. The methacrylic resin film for being laminated on a molded article comprising a polyvinyl chloride resin composition containing a plasticizer in accordance with claim 6, wherein the methacrylic resin composition (C) is a two-layer structure polymer of the acrylic crosslinked elastic particles (B), and the methacrylate polymer (A), an average particle size of the methacrylic resin composition (C) is more than 100 nm and 400 nm or less, and the acrylic crosslinked elastic particle (B) content is 5 to 45 wt % based on the entire methacrylic resin composition (C).

8. A vinyl chloride laminate comprising the methacrylic resin film for being laminated on a molded article comprising a polyvinyl chloride resin composition containing a plasticizer in accordance with claim 6 laminated on a molded article comprising a polyvinyl chloride resin composition containing a plasticizer.

* * * * *